United States Patent Office 3,303,967
Patented Feb. 14, 1967

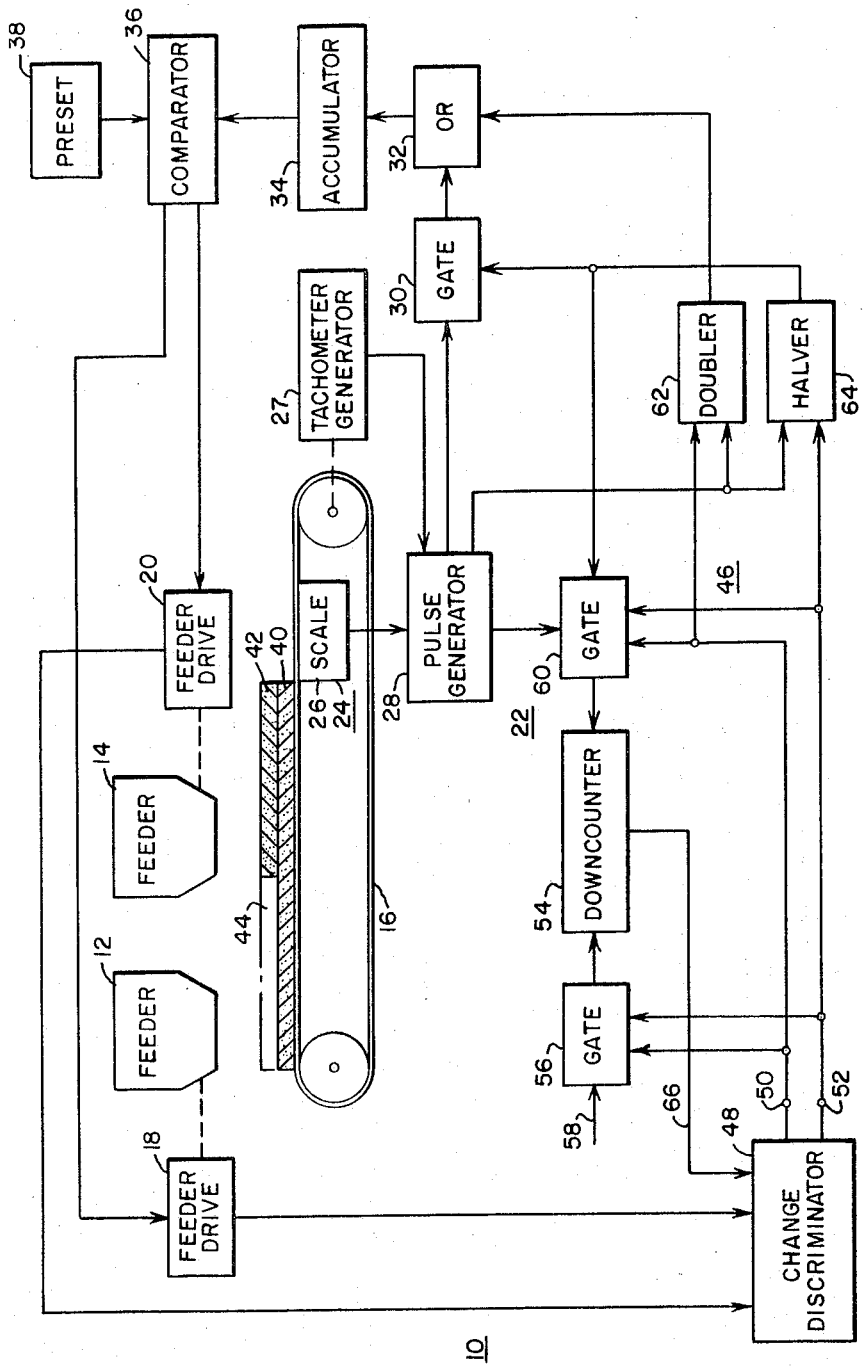

3,303,967
FEEDBACK CONTROL FOR A MATERIAL HANDLING SYSTEM PROVIDING AUTOMATIC OVERSHOOT CORRECTION
William A. Munson, Amherst Township, Williamsville, N.Y., assignor to Westinghouse Electric Corporation, Pittsburgh, Pa., a corporation of Pennsylvania
Filed Sept. 28, 1965, Ser. No. 490,825
10 Claims. (Cl. 222—14)

The present invention relates to controls for material handling systems and more particularly to control systems for accurately controlling the flow of material from feeders substantially without overshoot error.

A conventional approach for measuring and controlling the flow of material in a material handling or flow system is that in which an accumulator and a comparator are present to stop the material feeders after the predetermined units of material flow have been counted. The units of flow, such as units of weight, are often measured at a point removed from the feeders and overshoot material is therefore disposed in the transport path between the feeders and the measurement device after the feeders are stopped. The overshoot material must be considered in determining when the accumulator initiates the feeder stop action to produce a predetermined total flow.

As an illustration, assume that it is desired to meter 100 units of material and it is known that 10 units of material are disposed in the transport path during steady-state flow from a given number of feeders in service. The accumulator therefore stops the feeders after 90 units of material have been metered and the overshoot total of 10 units is transported to complete the 100 unit delivery. The accumulator and comparator thus stop the feeders after the desired total minus the expected overshoot quantity has been counted. If the overshoot quantity varies because of a change in the number of feeders in service, the delivery total deviates from the desired delivery unless the feeder cutoff count is changed. Manual in-process jogging has been the typical but labor consuming means employed to compensate for in-process feeder service change.

Blast furnaces form a typical application of the described material handling and control system. Input flow of various materials such as iron ore, sinter (enriched ore), coke and limestone is required for the furnace. Each material can be stored in a group of feeders or hoppers which are spaced along an associated conveyor belt. Vibrators can be operated to deposit material from each group of feeders onto the respectively associated conveyors. The materials are transported from the feeder conveyors to a main incline conveyor belt which transports the mixed materials to the furnace top for furnace charging. The material flow process is continuous for a predetermined time period after the furnace is started, and accurate control of the charge make-up is required.

A commercially available conveyor scale system can be associated with each belt to measure material flow in weight units. A feedback control for the material handling includes an accumulator and a comparator responsive to the scale system to control the feeders associated with each feeder conveyor. A single scale system is usually associated with each feeder conveyor rather than each hopper for capital cost economy. Changes in feeder service during the furnace material flow process result in problems similar to those described for the general case.

In accordance with the principles of the present invention, an improved feedback control for a material handling system comprises a feedback arrangement including an accumulator which initiates feeder stoppage in response to a flow measuring system after a predetermined count has been made of flow units transported to the delivery point. The cutoff count is automatically corrected by means responsive to the various feeders when a change in feeder service occurs.

It is therefore an object of the invention to provide a novel feedback control for a material handling system which operates with improved economy.

It is another object of the invention to provide a novel feedback control for a material handling system which operates with improved accuracy.

An additional object of the invention is to provide a novel accumulator system for controlling material flow from feeders wherein automatic correction is made for in-process changes in feeder service.

These and other objects of the invention will become more apparent upon consideration of the following detailed description along with the attached drawing, in which:

The single figure shows a schematic diagram of a material handling system arranged in accordance with the principles of the invention.

More specifically, a material handling system 10 includes feeders 12 and 14 in the form of hoppers in which solid material is disposed in suitable form for transfer to a conventional conveyor belt 16. A greater number of feeders can be employed if desired, and each employed feeder is gated by suitable means such as a vibrator (not shown) when material is to be transferred to the belt 16. The vibrators are operated by respective motor drives 18 and 20 subjected to on-off and other suitable control. The feeders 12 and 14 normally are in a predetermined on or off state, and during the flow process the feeders 12 and 14 can be purposely turned on of off or can be unexpectedly turned on or off due to factors such as vibrator jamming, vibrator clearance, and material runout. Flow of materials other than solid materials can be controlled from suitable storage devices and other forms of conveyance or channeling devices can de employed in accordance with the principles of the invention.

The material handling system 10 further includes a feedback control 22 which is arranged in accordance with the principles of the invention to control material flow from the feeders 12 and 14. In this case, the control 22 is principally a digital control system which requires no multiplication nor division computational operations, and it comprises a flow unit measuring system 24 preferably in the form of a commercially available conveyor scale 26 and a tachometer generator 27 which are both connected to a pulse generator 28. Suitable circuitry is provided in the pulse generator 28 to generate a pulse for each predetermined weight unit of the material conveyed by the belt 16. Conventional instantaneous weight measuring, conveyor speed measuring and integrating techniques are used to form the basis for pulse generation. In other cases, flow rate can be suitably metered and appropriately combined with flow distance or time measurement data to provide a basis for computing total flow.

Weight unit pulses are normally gated through a logic gate 30 and an OR gate 32 to an accumulator 34. Suitable counting circuitry is employed in the accumulator 34 to register the flow count. The accumulator 34 is coupled to a comparator 36 of suitable circuit design, and when the accumulator count reaches a preset level registered in the comparator memory by a suitable preset circuit 38, the comparator 36 generates respective outputs to stop the feeder drives 18 and 20.

When the drives 18 and 20 are stopped, overshoot material from the feeders 12 and 14, as indicated in the shaded area by respective reference characters 40 and 42, is disposed on the belt 16. To provide a common tail end for the material from the feeders 12 and 14, the comparator 36 is arranged to generate the two stop signals in appropriate time sequence so that the feeders 12 and 14 are stopped sequentially. Material added by the feeder 14 after the feeder 12 is stopped is indicated by dotted line 44.

The comparator output signals are generated when the desired flow less the expected overshoot flow has been counted. In this instance, the preset comparator count level is equal to the desired total flow count and the expected flow overshoot count is preset in the accumulator 34 for addition with the actual flow count. Hence, when the flow count reaches the desired count less the expected overshoot count, the feeders 12 and 14 are stopped. Accurately measured material flow is accordingly normally produced in each delivery. The same accuracy is realized if only one feeder 12 or 14 or if more than the two illustrated feeders are normally in service, since the expected overshoot count is then set in accordance with the number of feeders in service.

If the number of feeders in service changes during material flow, the overshoot flow is altered. For example, if the feeder 14 is stopped in a delivery cycle during which both feeders 12 and 14 are to operate, the material 40 from the feeder 12 constitutes an overshoot flow equal to one half the expected overshoot flow. If only one of the feeders 12 or 14 is to operate and the other feeder is started during the delivery cycle, the overshoot flow equals twice the expected overshoot flow.

To offset the error effects of a change in feeder service, the accumulator and comparator circuitry is caused to generate the feeder drive stop signals after a flow count which reflects an anticipated change in overshoot flow due to an in-process change in feeder service. Preferably, the overshoot correction is made by accumulator correction. Hence, a predetermined number of additional pulses are generated and fed to the accumulator 34 when the feeder service change is an increase, and a predetermined number of flow pulses are withheld from the accumulator 34 when the feeder service change is a decrease.

As an example, assume again that 100 units of material are desired and that each feeder 12 or 14 provides an overshoot of 5 units. The feeders would normally be sequentially stopped when the flow count reaches 90. If one feeder is inactivated during the flow process, the total overshoot is changed to 5 units and the accumulator and comparator circuitry effects feeder stoppage when 95 units of flow have been measured. To effect the measurement change, the feedback control 22 includes a feedback network 46 which withholds five flow pulses from the accumulator 34 after detecting a feeder outage. Thus, the accumulator 34 still reaches a count of 90 flow pulses when the feeder stoppage signals are generated, but the 90 count now represents a measurement of 95 flow units because of the feedback network operation.

In the opposite case where one feeder is normally operational to supply 100 units, and the other feeder is started during the flow process, the feedback network 46 adds five pulses to the input of the accumulator 34 so that the feeders 12 and 14 are stopped after 90 flow units rather than the normal 95 flow units. The expected overshoot of 5 units is changed to 10 units and the system adjusts to the change to produce accurate material delivery.

The accumulator circuitry is preferably arranged with a memory to record the previous load overshoot count. Hence, successive loads obtain different overshoot allowance only if these is a change in feeder service from load to load. In the example just cited, a feeder service change from one to two feeders would result in a change in the accumulator overshoot memory count from 5 to 10. The new 10 unit overshoot memory count is subtracted from the desired count or added to the actual count in meeting successive load demands and remains constant until a new feeder service change is detected.

Accumulator correction is similarly made in the general case where the number of available feeders is F and the change in feeder service is $(F \pm i) \ldots (F \pm m)$. The feedback network 46 is modifiable by artisan skill to provide for the various logically possible correction requirements for any particular number of available feeders.

To effect the described accumulator correction, the feedback network 46 is preferably a digital network and it includes a change discriminator 48 formed from suitable conventional logic circuitry and coupled respectively to the feeder drives 18 and 20, or starters (not shown) associated therewith, to sense any change in the number of feeders in service. When the change distriminator 48 is in a reset state, no output is generated and no accumulator correction is needed nor effected. When one of the two discriminator inputs indicates a change from on to off or off to on for one of the feeders 12 or 14, one of two memory outputs is generated at terminals 50 or 52 to initiate operation of a downcounter 54 for accumulator correction.

The downcounter 54 is preset with the expected overshoot from one feeder by means of a preset input which is applied to a blocking gate 56 as indicated by the reference character 58. When a feeder service change is detected, the change discriminator 48 provides an output from the terminal 50 or 52 to block the preset gate 56 and allow the downcounter 54 to proceed through the downcount. Simultaneously, the change discriminator output from the terminal 50 or 52 closes a gate 60 so that flow pulses from the generator 28 are transmitted to the downcounter 54.

As the downcount proceeds, the accumulator correction is produced by a doubler circuit 62 or a halver circuit 64 which are gated respectively by the change discriminator output signals from the terminals 50 and 52. When the required number of flow pulses are generated to bring the downcounter 54 to zero count, the downcounter 54 generates a signal to reset the change discriminator 48 as indicated by the reference character 66. The doubler and halver circuits 62 and 64 are accordingly deactivated and blocking signals are withdrawn from the preset gate 56 and the downcounter 54 is reset to the preset count level. The feedback network 46 is then prepared to effect new accumulator correction when the next feeder service change occurs.

When a decrease in feeder service is detected, the change discriminator output from the terminal 52 gates flow pulses from the generator 28 into the halver circuit 64. The halver circuit 64 generates a pulse to block every other generator pulse from the downcounter 54 and the accumulator 34 until the downcounter count reaches zero. Accumulator correction for feeder service cutback is produced by the withheld pulses. Similarly, the change discriminator output from the terminal 50 gates flow pulses from the generator 28 into the doubler circuit 62 which generates an additional time delayed pulse for each generator pulse until the downcounter count reaches zero. The added pulses are gated to the accumulator 34 through the OR gate 32 to produce accumulator correction for feeder service increase.

In continuation of a previous illustrative example, the downcounter 54 is preset for a downcount of five. A feeder cutback change signal from the change discriminator terminal 52 initiates the downcount and every other pulse in the next 10 flow pulses from the generator 28 is withheld from the accumulator 34 by the halver circuit 64 through blocking action at the gate 30. Every other pulse is also blocked from the downcounter 54 so that the required downcount of ten can be completed with the five count preset of the downcounter 54. A feeder increase change signal from the change discriminator terminal 50 initiates the downcount and a pulse is added to the accumulator 34 by the doubler circuit 62 for each of the next five flow pulses from the generator 28. If a feeder change is detected at a time point when the downcounter 54 cannot complete its downcount before the previously set accumulator count is reached, the feeder 12 and/or the feeder 14 are stopped, and the downcount and the accumulator correction are completed during the overshoot runoff or during the beginning of the next material delivery cycle.

The specific circuitry employed for the change discriminator 48, the various gates, the downcounter 54, the doubler 62 and the halver 64, the accumulator 34 and other system components may be any suitable circuitry including logic circuits such as flip-flops and logic gates of any desired logic type. The logic circuits can be formed from conventional components or by monolithic or molecular logic blocks. The automatic feedback control 22 can thus be provided in a great variety of forms and in a great variety of material handling applications for the purpose of achieving efficient and economic overshoot correction.

The foregoing description has been presented only to illustrate the principles of the invention. Accordingly, it is desired that the invention be not limited by the embodiment described, but, rather, that it be accorded an interpretation consistent with the scope and spirit of its broad principles.

What is claimed is:

1. A feedback control for a material handling system having at least two feeders from which material is transferred to a conveyance device for movement to a delivery point, said feedback control comprising means responsive to the amount of material flow and spaced from the feeders along the delivery path, means preset for an expected material overshoot based on the number of feeders in service and responsive to said flow responsive means to stop the feeders when the total amount of detected material flow reaches a predetermined value equal to the desired value less the preset overshoot value, and feedback means responsive to a change in the number of feeders in service for automatically modifying the operation of said stop means so as to correct for the resultant change in overshoot from the expected value.

2. A feedback control as set forth in claim 1 wherein said flow responsive means generates a pulse for each predetermined unit of material flow, said stop means comprises an accumulator having a preset overshoot count based on the number of feeders in service and being coupled to said flow responsive means to count the generated pulses, said feedback means comprises a change discriminator coupled to the feeders, and means responsive to the change discriminator to add a predetermined number of pulses to said accumulator for each feeder added to service and to withhold from said accumulator a predetermined number of the pulses generated by said flow responsive means for each feeder service cutback.

3. A feedback control as set forth in claim 2 wherein said add and withhold means is additionally responsive to said flow responsive means so as to generate at least one additional pulse for accumulation for each of a predetermined number of successive flow responsive means pulses and so as to withhold at least every other flow responsive means pulse from accumulation for a predetermined number of successive flow responsive means pulses.

4. A feedback control as set forth in claim 3 wherein said add and withhold means includes a downcounter coupled to said flow responsive means and operated by said flow responsive means when said change discriminator generates an output, means for presetting and resetting said downcounter, said downcounter coupled to said change discriminator to reset said change discriminator when the downcount reaches zero.

5. A feedback control as set forth in claim 4 wherein said flow responsive means includes a pulse generator and said add and withhold means further includes at least a doubler and at least a halver gated by respective signals from said change discriminator to generate pulses for accumulator correction in response to pulses generated by said pulse generator.

6. A feedback control as set forth in claim 5 wherein a blocking gate and an OR gate are series connected to couple said pulse generator to said accumulator, a blocking gate couples said pulse generator to said downcounter, said doubler feeds the predetermined number of pulses to said accumulator through said OR gate, and said halver is connected to said blocking gates to block alternate generator pulses from said accumulator and said downcounter for the predetermined number of successive generator pulses.

7. A feedback control as set forth in claim 4 wherein said downcounter presetting and resetting means includes a blocking gate connected to said downcounter and is placed in a blocking state by output signals from said change discriminator.

8. A feedback control as set forth in claim 1 wherein said flow responsive means includes a scale system and a pulse generator so as to generate a pulse for each predetermined weight unit of material conveyed from the feeders, said stop means being responsive to said pulse generator.

9. A feedback control as set forth in claim 2 wherein said stop means further includes a preset comparator responsive to said accumulator to stop the feeders.

10. A feedback control as set forth in claim 8 wherein said stop means comprises an accumulator having a preset overshoot count based on the number of feeders in service and being coupled to said pulse generator to count the generated pulses, said feedback means comprises a change discriminator coupled to the feeders, and means responsive to said change discriminator to add a predetermined number of pulses to said accumulator for each feeder added to service and to withhold from said accumulator a predetermined number of the pulses generated by said pulse generator for each feeder service cutback.

References Cited by the Examiner

UNITED STATES PATENTS

| 3,130,867 | 4/1964 | Jackel | 222—76 X |
| 3,130,868 | 4/1964 | Phillips et al. | 222—76 X |

ROBERT B. REEVES, *Primary Examiner.*

HADD S. LANE, *Assistant Examiner.*